United States Patent
Sung

(10) Patent No.: US 12,089,067 B2
(45) Date of Patent: Sep. 10, 2024

(54) PDCCH LINK CONTROL BASED ON TIMING ADVANCE AND USER SERVICE BEAM MODE IN MASSIVE MIMO SYSTEMS

(71) Applicant: T-MOBILE INNOVATIONS LLC, Overland Park, KS (US)

(72) Inventor: Sanghoon Sung, Ashburn, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 17/961,293

(22) Filed: Oct. 6, 2022

(65) Prior Publication Data

US 2024/0121624 A1 Apr. 11, 2024

(51) Int. Cl.
*H04W 16/28* (2009.01)
*H04B 7/0413* (2017.01)
*H04W 84/04* (2009.01)

(52) U.S. Cl.
CPC .......... *H04W 16/28* (2013.01); *H04B 7/0413* (2013.01); *H04W 84/042* (2013.01)

(58) Field of Classification Search
CPC ... H04W 16/28; H04W 84/042; H04B 7/0413
USPC ................................ 375/260, 262, 267, 299
See application file for complete search history.

(56) References Cited

U.S. PATENT DOCUMENTS

| | | | | |
|---|---|---|---|---|
| 7,979,090 B2* | 7/2011 | Alm | ...................... | H04B 7/0617 455/562.1 |
| 2009/0232125 A1* | 9/2009 | Kim | ..................... | H04L 27/2675 370/350 |
| 2019/0053184 A1* | 2/2019 | Park | ....................... | H04W 76/18 |
| 2021/0041522 A1* | 2/2021 | Manolakos | ............ | H04B 7/086 |
| 2021/0399797 A1* | 12/2021 | Khan | ................. | H04B 7/18541 |
| 2022/0078738 A1* | 3/2022 | Zhang | .................. | H04B 7/0695 |
| 2023/0189181 A1* | 6/2023 | Liberg | .............. | H04W 56/0015 370/350 |

FOREIGN PATENT DOCUMENTS

| CN | 106900053 B | * | 6/2020 | ........... H04L 1/1835 |
|---|---|---|---|---|
| TW | 202135544 A | * | 9/2021 | ........... G01S 5/0063 |

\* cited by examiner

*Primary Examiner* — Emmanuel Bayard
(74) *Attorney, Agent, or Firm* — Shook, Hardy & Bacon L.L.P.; Elena K. McFarland

(57) ABSTRACT

Systems and methods provided for controlling a downlink channel based on a time advance and a beam mode at a cell site. The cell site includes a link management system communicatively coupled to one or more user devices. The link management system is to replace a response identifier with a cell identifier responsive to a move from an idle mode to an active mode, store a time advance and the cell identifier based on a time advance group that corresponds to the one or more user devices, adapt a quality indication offset based on the time advance group, determine a downlink channel indication based on the quality indication offset and the time advance group, and activate a beam mode for communication with the one or more user devices of the time advance group based on the downlink channel indication.

20 Claims, 4 Drawing Sheets

PDCCH LINK CONTROL BASED ON TIMING ADVANCE AND USER SERVICE BEAM MODE IN MASSIVE MIMO SYSTEMS

SUMMARY

The present disclosure is directed, in part, to controlling a downlink channel based on a time advance and a beam mode at a cell site, substantially as shown in and/or described in connection with at least one of the figures, and as set forth more completely in the claims.

In aspects set forth herein, a determination of downlink channel indication is made and the beam mode is activated for communication with the user device(s) of a time advance group based on the downlink channel indication. Typically, the downlink channel indication is determined by an offset of the signal-to-interference-plus-noise ratio (SINR) and the physical downlink shared channel channel quality indication (PDSCH CQI). However, here, the downlink channel indication is determined based on a quality indication offset and a time advance group. The activation of the beam mode for communication with user devices(s) of the time advance group based on the downlink channel indication reduces a blocking increase in the downlink channel and reduces an increase in the downlink and/or uplink discontinuous transmission.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
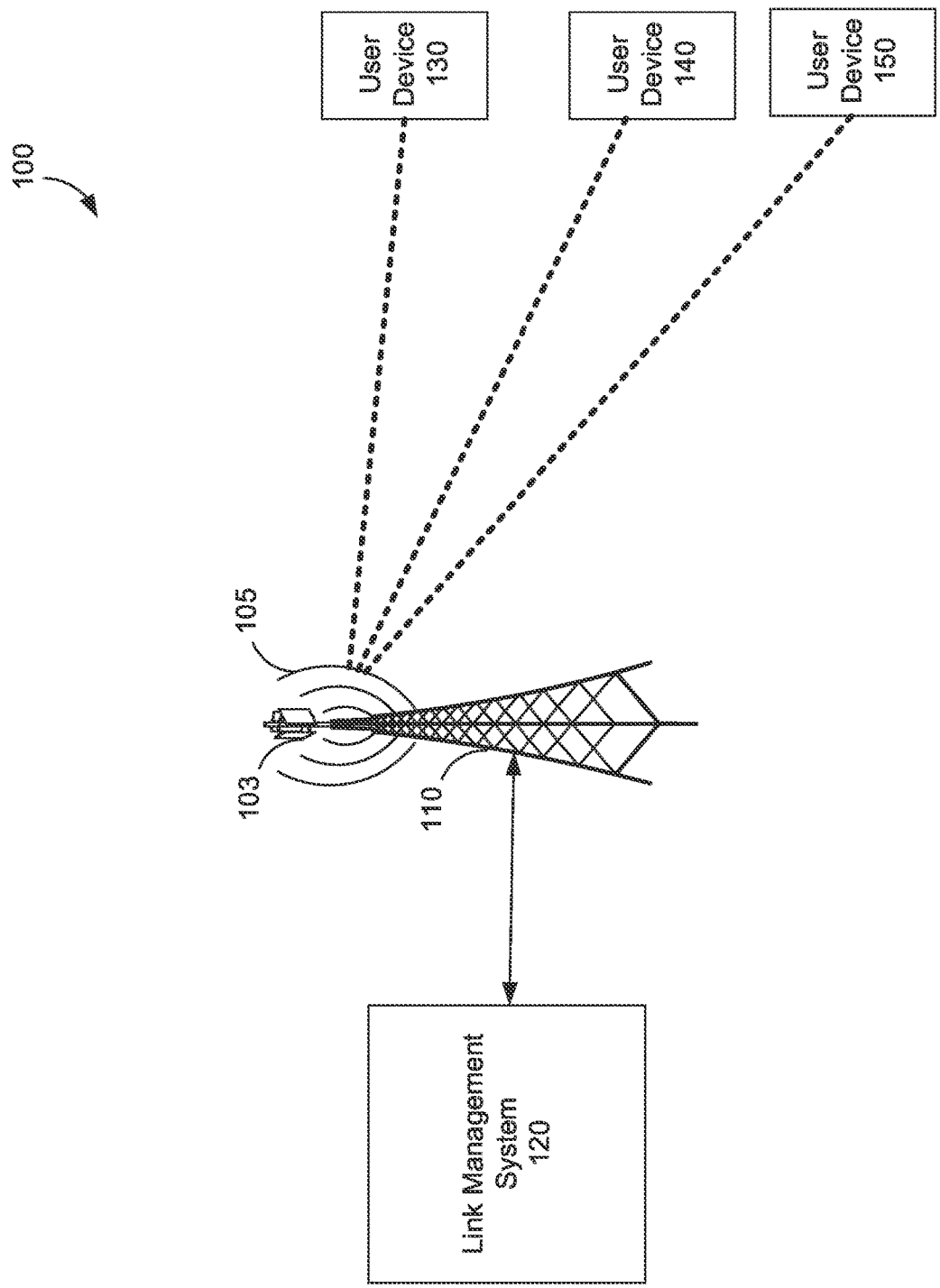
FIG. 1 depicts an example of a network environment in accordance with one or more embodiments.

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In certain aspects, methods are provided for controlling a downlink channel based on a time advance and a beam mode at a cell site of a telecommunication network (e.g., a 5G network or any other suitable network). A response identifier is replaced with a cell identifier responsive to a move from an idle mode to an active mode. A time advance and the cell identifier is stored based on a time advance group that corresponds to the one or more user devices. A quality indication offset is adapted based on the time advance group. A downlink channel indication is determined based on the quality indication offset and the time advance group. A beam mode for communication with the one or more user devices of the time advance group based on the downlink channel indication is activated.

Advantageously, providing methods and systems for controlling a downlink channel of a telecommunication network (e.g., a 5G network) by utilizing a time advance and beam mode reduces blocking increases in the downlink channel (e.g., PDCCH) if the modulation coding scheme (MCS) is low (e.g., conservative) and reduces increases in the downlink and/or uplink discontinuous transmission (DL/UL DTX) if the modulation coding scheme for the downlink channel is high (e.g., aggressive).

In one aspect, a method is provided for controlling a downlink channel based on a time advance and a beam mode at a cell site. The method includes replacing, by a link management system communicatively coupled to one or more user devices, a response identifier with a cell identifier responsive to a move from an idle mode to an active mode. The method also includes storing a time advance and the cell identifier based on a time advance group that corresponds to the one or more user devices. The method further includes adapting a quality indication offset based on the time advance group. The method further includes determining a downlink channel indication based on the quality indication offset and the time advance group. The method also includes activating a beam mode for communication with the one or more user devices of the time advance group based on the downlink channel indication.

In another aspect, a computer-readable storage media having computer-executable instructions embodied thereon is provided that, when executed by one or more processors, cause the processors to perform various steps. The processors are caused to replace, by a link management system communicatively coupled to one or more user devices, a response identifier with a cell identifier responsive to a move from an idle mode to an active mode. The processors are also caused to store a time advance and the cell identifier based on a time advance group that corresponds to the one or more user devices in real-time or near real-time. The processors are further caused to adapt a quality indication offset based on the time advance group. The processors are further caused to determine a downlink channel indication based on the quality indication offset and the time advance group. The processors are further caused to activate a beam mode for communication with the one or more user devices of the time advance group based on the downlink channel indication.

In yet another aspect, a system is provided for controlling a downlink channel based on a time advance and a beam mode at a cell site. The system includes cell site including a link management system communicatively coupled to one or more user devices. The link management system replaces a response identifier with a cell identifier responsive to a move from an idle mode to an active mode. The link management system also stores a time advance and the cell identifier based on a time advance group that corresponds to the one or more user devices. The link management system adapts a quality indication offset based on the time advance group. The link management system further determines a downlink channel indication based on the quality indication offset and the time advance group. The link management system further activates a beam mode for communication with the one or more user devices of the time advance group based on the downlink channel indication.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable media, and nonremovable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 400 shown in FIG. 4. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

The terms "user equipment," "UE," and "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 provides service to one or more user devices 130, 140, and 150. In some embodiments, the network environment 100 may be a telecommunication network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. Those devices and components may provide connectivity in a variety of implementations. In addition the network environment 100 may be utilized in a variety of manners, such as a single network, multiple networks, or as a network of networks, but, ultimately, is shown as simplified as possible to avoid the risk of confusing other aspects of the present disclosure.

The network environment 100 may include or otherwise may be accessible through a cell site 110. The cell site 110 may include one or more antennas 103, base transmitter stations, radios, transmitter/receivers, digital signal processors, control electronics, GPS equipment, power cabinets or power supply, base stations, charging stations, etc. such that the cell site 110 may provide a communication link between the one or more user devices 130, 140, and 150 and other components, systems, equipment, and/or devices of the network environment 100. The base station and/or a computing device (e.g., whether local or remote) associated with the base station may manage or otherwise control the operations of components of the cell site 110.

The one or more antennas 103 may emit a beam 105 that may cover a geographic area. The one or more antennas 103 are capable of using beamforming as at least one signal processing operation (e.g., technique). The beam 105 is operable in one or more beam modes.

In a stand alone mode, the network environment 100 may take the form of a 5G network or any other suitable network. In some embodiments, the cell site 110 may be operable in a non-stand alone mode.

In the non-stand alone (NSA) mode, the network environment 100 may take the form of, for example, an E-UTRAN New Radio-Dual Connectivity (EN-DC) network. In an EN-DC network, a user device (e.g., the user device 130, 140, and/or 150) may connect to or otherwise access a 4G, LTE, 5G, 5G NR, or any other suitable network simultaneously.

In some embodiments, the network environment 100 may include a link management system (e.g., the link management system 120). The link management system may include one or more nodes communicatively coupled to the user device(s) 130, 140, and/or 150 such that the link management system may transmit to and receive requests and/or data from one or more user devices. The one or more nodes may include a Next Generation Node B (e.g., gNodeB or gNB) or any other suitable node structured to communicatively couple to the user device(s) 130, 140, and/or 150. The one or more nodes may correspond to one or more frequency bands. A frequency is the number of times per second that a radio wave completes a cycle. The frequency band may include a frequency range (e.g., a lower frequency and an upper frequency) within which the user device(s) may connect to the network environment such as, but not limited to, a telecommunication network or a portion thereof. The frequency range may be measured by the wavelength in the range.

In some embodiments, the user device 130, 140, and/or 150 may take the form of a wireless or mobile device capable of communication via the network environment 100. For example, the user device 130 may take the form of a mobile device capable of communication via a telecommunication network such as, but not limited to, a wireless telecommunication network. In this regard, the user device may be any mobile computing device that communicates by way of a network, for example, a 3G, CDMA, 4G, LTE, WiMAX, 5G or any other type of network.

In some embodiments, the network environment 100 may be structured to connect subscribers to a service provider or a plurality of service providers. Alternatively or additionally, the network environment 100 may be associated with a specific telecommunication provider that provides services (e.g. 5G, voice, location, etc.) to one or more user devices 130, 140, and/or 150. For example, the user devices 130, 140, and 150 may be subscribers to a telecommunication service provider, in which the user devices 130, 140, and 150 are registered or subscribed to receive voice and data services over the network environment 100. The network environment 100 may include any communication network providing voice and/or data service(s), such as, for example, a 1x circuit voice, a 3G network (e.g., CDMA, CDMA 2000, WCDMA, GSM, UMTS, a 4G network (LTE, WiMAX, HSDPA), a 5G network, or a 6G network.

Having described the network environment 100 and components operating therein, it will be understood by those of ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2:
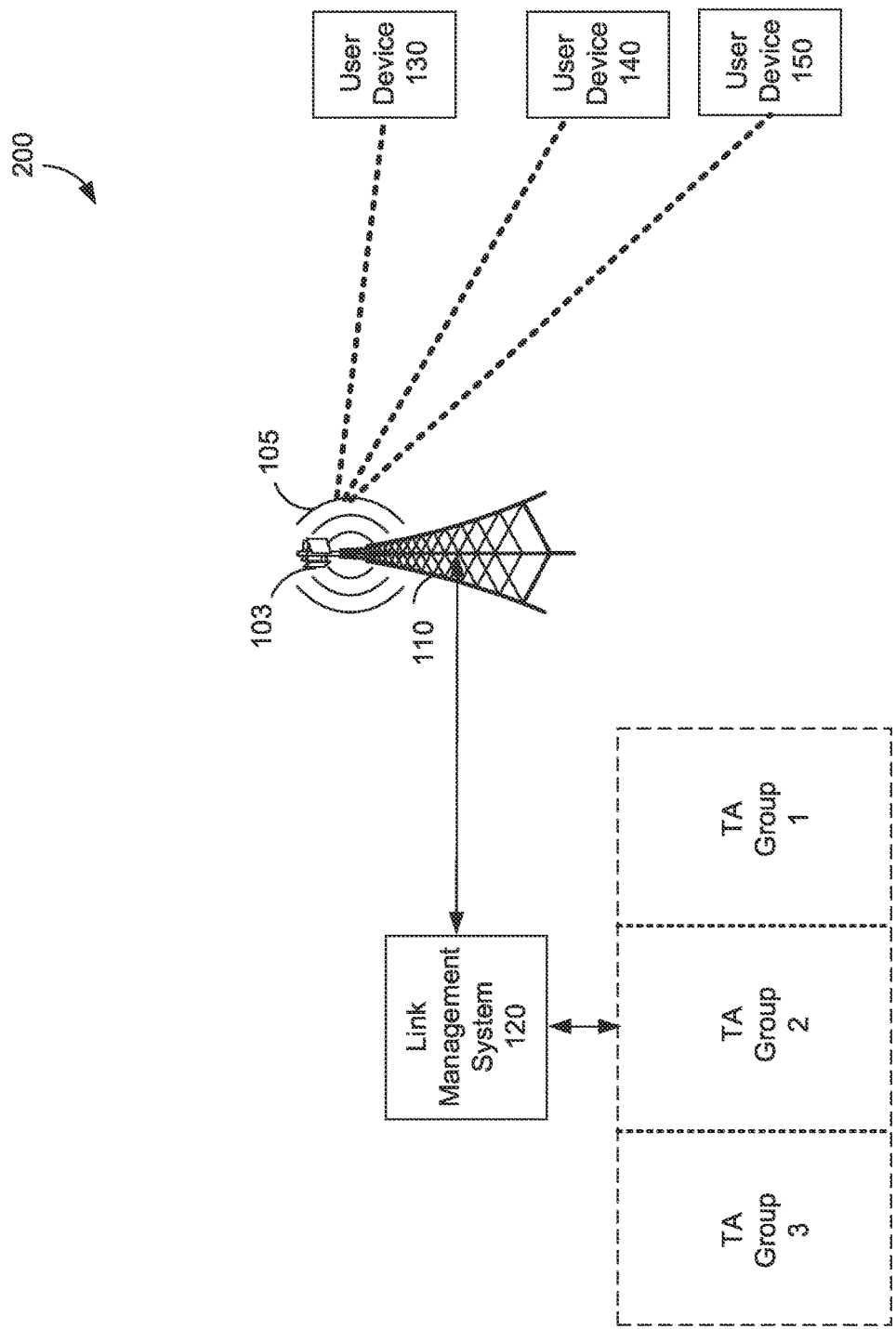
FIG. 2 is a diagram of a network environment including a cell site and a link management system in accordance with an example embodiment.

FIG. 2 is a diagram of the network environment 200 (e.g., a telecommunication network such as, but not limited to, a wireless telecommunication network) including a cell site and a link management system according to an example embodiment. In the present embodiment, the network environment 200 includes the antenna 103, beam 105, cell site 110, link management system 120, one or more user devices 130, 140, and 150, and one or more time advance groups 1, 2, and 3. Although some of the components in the network environment 200 are depicted as single components (e.g., a single antenna, cell site, or link management system), in some embodiments, the network environment 200 may include a plurality of such components from 1 to N.

The link management system 120 may include one or more nodes. For example, the link management system 120 may include or otherwise take the form of a 5G massive MIMO capable gNodeB (e.g., the gNodeB is communicatively coupled to an antenna structured for massive multiple-input and multiple-output (mMIMO)). In some embodiments, the link management system 120 may be included within the cell site 110, external to the cell site 110, or otherwise communicatively coupled to the cell site 110. The link management system 120 may allocate radio frequency, or a portion thereof, to user device(s). In further embodiments, the link management system 120 may be structured to manage the operation (e.g., the Multiple-Input Multiple-Output (MIMO) operation, massive MIMO operation, etc.) of one or more antennas (e.g., the antenna 103). The one or more antennas 103 may emit the beam 105 that is operable in one or more beam modes. A downlink channel may be controlled based on a time advance (e.g., a timing advance), and as described herein, such that the one or more beam modes provide benefits that are received at the user device(s) 130, 140, and 150. Alternatively or additionally, the link management system 120 may manage the signaling (e.g., Orthogonal Frequency-Division Multiplexing (OFDM) signaling) within the network 200. The link management system 120 may manage a Radio Access Network (RAN) or any other suitable network.

In some embodiments, the link management system 120 (e.g., a gNodeB or gNB) may replace a response identifier with a cell identifier responsive to a move from an idle mode to an active mode. The response identifier may include or otherwise take the form of a Random Access Radio Network Temporary Identifier (RA-RNTI). The cell identifier may include or otherwise may take the form of a Cell Radio Network Temporary Identifier (C-RNTI) which is a unique user device identification that is used as an identifier of the Radio Resource Control (RRC) Connection. For example, upon completion of the idle mode (e.g., a Radio Resource Control (RRC) inactive mode) to an active mode (e.g., a RRC active mode), the link management system 120 may replace RA-RNTI with C-RNTI. The link management system 120 may be communicatively coupled to one or more user devices such that the link management system 120 may replace the response identifier with the cell identifier corresponding to the one or more user devices (e.g., the user devices 130, 140, and 150) within a geographic area. The cell identifier may be used for scheduling by, for example, scheduler (e.g., a scheduling system, scheduling unit, etc.).

In some embodiments, the link management system 120, may store a time advance and a cell identifier based on a time advance group that corresponds to the one or more user devices. In some embodiments, a plurality of time advances and a plurality of cell identifiers may be stored based on a plurality of time advance groups (e.g., TA Group 1, TA Group 2, and/or TA Group 3). As used herein the term "time advance" (TA) may be used to refer to a distance between the user device (e.g., the user device(s) 130, 140, and/or 150) and the cell site (e.g., the cell site 110). Advantageously, the link management system 120 may control or otherwise adapt the beam mode (e.g., beamforming mode) for a served user device by utilizing the time advance (e.g., the timing advance information, distance, etc.).

The time advance, the cell identifier, and/or the time advance group may be stored within the link management system 120, external to the link management system 120, or otherwise may be communicatively coupled to the link management system 120. The time advance group(s) may be stored in a scheduler (e.g., a scheduling unit and/or scheduling circuitry), memory, or in any other suitable system, component, device, etc. For example, the link management system 120 may store TA and {C-RNTI/TA}, the cell identifier (e.g., unique user device identification) used as an identifier of the RRC Connection and for scheduling in a scheduling unit, based on the TA grouping (e.g., TA Group 1, TA Group 2, and/or TA Group 3). The time advance and/or the cell identifier may be stored temporarily, simultaneously, or in any order. In the example above, TA Group 1 may include {C-RNTI/TA . . . }, TA Group 2 may include {C-RNTI/TA}, and TA Group 3 may include {C-RNTI/TA . . . }, etc.

In some embodiments, the link management system 120 (e.g., the gNodeB) may adapt a quality indication offset (e.g., PDCCH CQI offset) based on the time advance group. The link management system 120 may be capable of massive MIMO such that the link management system 120 may utilize beamforming technique information to adapt the quality indication offset (the quality indication offset value) for a served user device (e.g., the user device(s) 130, 140, and/or 150). The link management system may utilize a different quality indication offset (e.g., PDCCH CQI offset) for each respective time advance group (e.g., TA Group 1, TA Group 2, and/or TA Group 3). For example, TA Group 1 may be closest in distance to the cell site 110 such that the quality indication offset (e.g., PDCCH CQI offset) may be set to "1" which results in a downlink channel modulation coding scheme (PDCCH MCS) that is close to the physical downlink shared channel modulation coding scheme (PDSCH MCS). TA Group 2 may be mid-distance to the cell site 110 such that the quality indication offset (e.g., PDCCH CQI offset) may be set to "3." TA Group 3 may be the furthest distance to the cell site 110 such that the quality indication offset (e.g., PDCCH CQI offset) may be set to "5" which results in a conservative PDCCH MCS scheduling when compared to the PDSCH MCS.

In some examples, the link management system 120 may determine a downlink channel indication (e.g., a physical downlink control channel channel quality indication (PDCCH CQI)) based on the quality indication offset (e.g., CQI offset) and the time advance group. The downlink channel (e.g., PDCCH channel) may be used to carry DCI (Downlink Control Information) such as, but not limited to, downlink scheduling assignments and uplink scheduling grants. The downlink channel (e.g., 5G NR PDCCH channel(s)) may occupy one or more subcarriers and OFDM symbols. The downlink channel(s) may be transmitted in the CORESET (Configurable Control Resource Set). The telecommunication network (e.g., 5G NR network) may be flexible in the time domain and/or frequency domain. In some embodiments, the frequency allocation in the CORESET may be contiguous or non-contiguous. In the time domain, the frequency allocation may occupy, in some examples, 1 to 3 consecutive OFDM symbols. One or more REs (Resource Elements) in the CORESET may be arranged in REGs (RE Groups). Each REG may include, for example, 12 REs of one OFDM symbol per REG.

In some embodiments, the link management system 120 may activate a beam mode for communication with the one or more user devices of the time advance group based on the downlink channel indication (e.g., PDCCH CQI). The downlink channel indication and the link management system (e.g., 5G gNodeB) provide the capability to activate or otherwise control different beam mode(s) (e.g., beamforming operations (e.g., techniques)) for each respective time advance group. Accordingly, the link management system 120 may move the beam mode from an inactive beam mode to an active beam mode for communication with the user device(s) based on the downlink channel indication. This results in providing the best beam mode(s) to the user device(s) by using the determined downlink channel indication. In some embodiments, the beam mode may be activated for communication with one or more user devices simultaneously. For example, the beam mode may apply the beam 105 to different user devices simultaneously in real-time or near real-time.

The beam mode may selectively communicate with the one or more user devices according to at least one time advance group. The beam mode may include or otherwise take the form of a channel reciprocity mode, codebook mode, interference reduction mode, beamsweeping mode, or a combination thereof. In the interference reduction mode, for example, the link management system 120 may prefer to provide link reliable, interference reducing beam operations (e.g., techniques) to a served user device located in a geographic area (e.g., located within a cell boundary and/or at the edge of a cell boundary). Advantageously, the provision of link reliable, interference reducing beam operations via the interference reduction mode optimizes or otherwise increases the user data rate. Accordingly, the PDSCH beamforming gain may be different based on the technique utilized for the user device. In this regard, the SINR gap between a non-beamformed downlink channel (PDCCH) and a beamformed downlink shared channel (PDSCH) may be different based on the technique. The link management system 120 may utilize a different PDCCH CQI offset for respective massive MIMO PDSCH beamforming techniques. For example, beamforming group 1 based on interference reduction may result in a PDCCH CQI offset set to "1" which produces the least beam forming SINR gain for PDSCH. In such examples, the PDCCH MCS may be set close to the PDSCH MCS.

Alternatively or additionally, the link management system 120 may prefer the channel reciprocity mode, the code book mode, or any other suitable mode to provide data operations (e.g., techniques) to a served user device located in a geographic area that result in higher data rates.

In embodiments wherein the beam mode is based on the codebook mode (e.g., codebook beamforming), the band support may take the form of TDD, Frequency Division Duplex (FDD), or any other suitable spectrum technique. The user device(s) may provide a request, data, and/or feedback to the link management system 120 by a channel-state information reference signal (CSI-RS) precoding matrix indicator (PMI) report, or any other suitable signal, indicator, or report. The beam mode (e.g., the codebook mode) may cause the beam 105 (e.g., the service beam pattern shape) to take the form of a 2-D DFT beam (e.g., a beam derived from or otherwise based on a 2D-Discrete Fourier transform) or any other suitable beam. The operation coverage may include channel state information (CSI) coverage based on, for example, the CSI-RS PMI report. In some examples, beamforming group 2 based on codebook beamforming (e.g., codebook PMI beamforming) may result in a PDCCH CQI offset set to "3."

In embodiments wherein the beam mode is based on the channel reciprocity mode (e.g., channel reciprocity beamforming), the band support may take the form of Time Division Duplex (TDD). The user device(s) may provide request(s), data, and/or feedback to the link management system 120 by an uplink sounding reference signal (UL SRS), uplink demodulation reference signal (UL DMRS), and/or any other suitable signal. In some embodiments, the beam mode (e.g., the channel reciprocity mode) may cause the beam 105 (e.g., the service beam pattern shape) to take the form of an adaptive beam (e.g., a beam derived from or otherwise based on adaptive spatial signal processing) or any other suitable beam. The operation coverage may include channel state information (CSI) coverage. For example, the operation coverage may include UL SRS coverage (e.g., UL SRS transmission). In some examples, beamforming group 3 based on channel reciprocity beamforming may result in a PDCCH CQI offset set to "5" which produces the most beam forming SINR gain for PDSCH such that the SINR gap between beamformed PDSCH and nonbeamformed PDCCH may be increased. In such examples, the result may be a conservative PDCCH MCS scheduling when compared to the PDSCH MCS.

In embodiments wherein the beam mode is based on the beamsweeping mode (e.g., beamsweeping beamforming), the band support may take the form of TDD, FDD, or any other suitable spectrum technique. The user device(s) may provide/request data and/or feedback to the link management system 120 based on a synchronization signal block beam (SSB) index report, a CSI-RS beam index report, or any other suitable signal, indicator, or report. The beam mode (e.g., the beamsweeping mode) may cause the beam 105 (e.g., the service beam pattern shape) to take the form of a set of pre-defined beams, directional beams, and/or any other suitable beam. The operation coverage may be based on a SSB power measurement and/or SSB power report.

Advantageously, controlling a downlink channel based on a time advance and a beam mode at a cell site reduces a blocking increase in the downlink channel (e.g., PDCCH) if the modulation coding scheme (MCS) is low (e.g., conservative) and reduces an in increase in the downlink and/or uplink discontinuous transmission (DL/UL DTX) if the modulation coding scheme for the downlink channel is high (e.g., aggressive).

Figure 3:
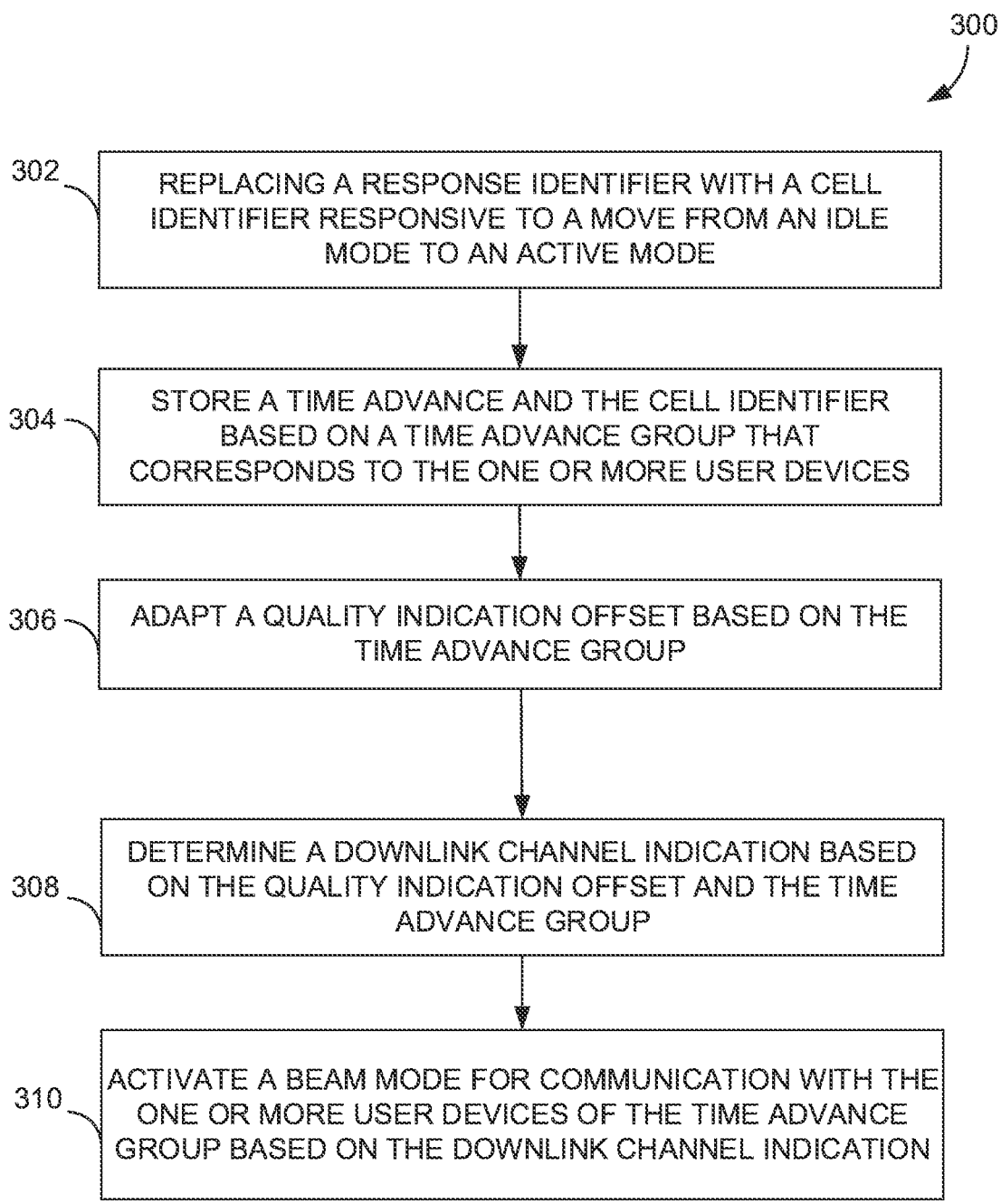
FIG. 3 depicts a flowchart of an exemplary method for controlling a downlink channel based on a time advance and a beam mode at a cell site in accordance with an example embodiment.

FIG. 3 depicts a flow diagram of an exemplary method 300 for controlling a downlink channel based on a time advance and a beam mode at a cell site, in accordance with implementations of the present disclosure. Initially at block 302 a response identifier (e.g., RA-RNTI)) is replaced with a cell identifier (e.g., C-RNTI) responsive to a move from an idle mode to an active mode. The link management system may replace the response identifier with the cell identifier corresponding to one or more user devices.

At block 304, a time advance and a cell identifier is stored by the link management system based on a time advance group that corresponds to the one or more user devices. The time advance (TA) may include a distance between a user device and a cell site. The time advance and/or the cell identifier may be stored temporarily, simultaneously, etc. A plurality of time advances and a plurality of cell identifiers may be stored based on a plurality of time advance groups (e.g., TA Group 1, TA Group 2, and/or TA Group 3). The time advance group(s) may be stored in a scheduler.

In some embodiments, a quality indication offset is adapted based on the time advance group at block 306. The link management system may utilize beamforming technique information to adapt the quality indication offset for the served user device. The link management system may utilize a different quality indication offset (e.g., PDCCH CQI offset) for each time advance group (e.g., TA Group 1, TA Group 2, and/or TA Group 3).

At block 308, a downlink channel indication (e.g., PDCCH CQI) is determined based on the quality indication offset (e.g., CQI offset) and the time advance group. The downlink channel (e.g., PDCCH channel) may be used to carry DCI (e.g., downlink scheduling assignments). The downlink channel may occupy one or more subcarriers and OFDM symbols. In some examples, the downlink channel(s) may be transmitted in the CORESET (Configurable Control Resource Set) that may include one or more REs (Resource Elements) arranged in REGs (RE Groups).

At block 310, a beam mode for communication with the one or more user devices of the time advance group is activated based on the downlink channel indication (e.g., PDCCH CQI). The beam mode may include a channel reciprocity mode, codebook mode, interference reduction mode, or a combination thereof. The downlink channel indication and the link management system (e.g., 5G gNodeB) may activate or otherwise control different beam mode(s) (e.g., beamforming techniques) for each respective time advance group. In this regard, the link management system may move the beam mode from an inactive beam mode to an active beam mode for communication with the user device(s) based on the downlink channel indication in real-time or near real-time.

Figure 4:
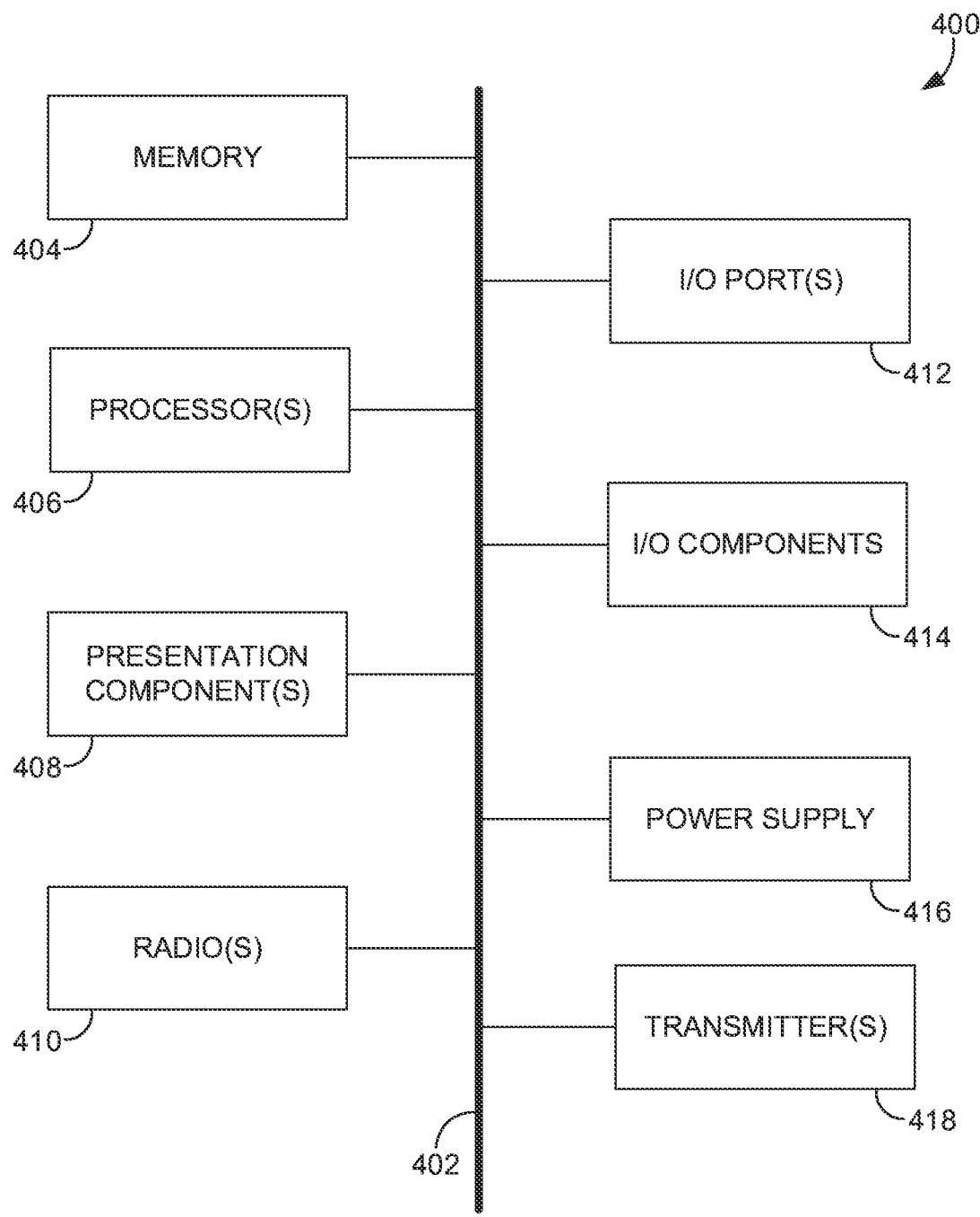
FIG. 4 depicts an exemplary computing device suitable for use in implementations of aspects herein.

Referring to FIG. 4, a block diagram of an example of a computing device 400 suitable for use in implementations of the technology described herein is provided. In particular, the exemplary computer environment is shown and designated generally as computing device 400. Computing device 400 is but one example of a suitable computing environment and is not intended to suggest any limitation as to the scope of use or functionality of the invention. Neither should computing device 400 be interpreted as having any dependency or requirement relating to any one or combination of components illustrated. In aspects, the computing device 400 may be a base station. In another embodiment, the computing device 400 may be UE capable of two-way wireless communications with an access point. Some non-limiting examples of the computing device 400 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 4, computing device 400 includes a bus 402 that directly or indirectly couples various components together. The bus 402 may directly or indirectly one or more of memory 404, processor(s) 406, presentation component(s) 408 (if applicable), radio(s) 410, input/output (I/O) port(s) 412, input/output (I/O) component(s) 414, power supply 416, and/or transmitter(s). Although the components of FIG. 4 are shown with lines for the sake of clarity, in reality, delineating various components is not so clear, and metaphorically, the lines would more accurately be grey and fuzzy. For example, one may consider a presentation component(s) 408 such as a display device to be one of I/O components 414. Also, the processor(s) 406 may include memory 404, in another example. The present disclosure hereof recognizes that such is the nature of the art, and reiterates that FIG. 4 is merely illustrative of an example of a computing device 400 that may be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 404 may take the form of memory components described herein. Thus, further elaboration will not be provided here, but it should be noted that memory 404 may include any type of tangible medium that is capable of storing information, such as a database or data store. A database or data store may be any collection of records, files, or information encoded as electronic data and stored in memory 404, for example. In one embodiment, memory 404 may include a set of embodied computer-readable and executable instructions that, when executed, facilitate various functions or elements disclosed herein. These embodied instructions will variously be referred to as "instructions" or an "application" for short.

Processor(s) 406 may be multiple processors that receive instructions and process them accordingly. Presentation component(s) 408, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 410 represents one or more radios that facilitate communication with a wireless telecommunication network. For example, radio(s) 410 may be connected to one or more antenna elements through a physical path. Illustrative wireless telecommunications technologies include CDMA, GPRS, TDMA, GSM, and the like. Radio(s) 410 might additionally or alternatively facilitate other types of wireless communications including Wi-Fi, WiMAX, 3G, 4G, LTE, mMIMO, 5G, 6G, NR, VoLTE, and/or other VoIP communications. As can be appreciated, in various embodiments, radio(s) 410 may be configured to concurrently support multiple technologies, as previously discussed herein. As such, each of many radio(s) 410 may be used to separately control portions of an antenna array, for example, where at least one portion utilizes a distinct technology relative to another portion in the same antenna array or at the same base station or cell site. A wireless telecommunication network might include an array of devices, which are not shown so as to not obscure more relevant aspects of the invention. Components such as a base station, a communications tower, or even access points (as well as other components) can provide wireless connectivity in some embodiments.

The input/output (I/O) ports 412 may take a variety of forms. Exemplary I/O ports 412 may include a USB jack, a stereo jack, an infrared port, a firewire port, other proprietary communications ports, and the like. Input/output (I/O) components 414 may comprise keyboards, microphones, speakers, touchscreens, and/or any other item usable to directly or indirectly input data into the computing device 400.

Power supply 416 may include batteries, fuel cells, and/or any other component that may act as a power source to supply power to the computing device 400 or to other network components, including through one or more electrical connections or couplings. Power supply 416 may be configured to selectively supply power to different components independently and/or concurrently.

Finally, regarding FIGS. 1 through 4, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and sub-combinations are of utility and may be employed without reference to other features and sub-combinations and are contemplated within the scope of the claims.

The invention claimed is:

1. A method for controlling a downlink channel based on a time advance and a beam mode at a cell site, the method comprising:
    replacing, by a link management system communicatively coupled to one or more user devices, a response identifier with a cell identifier responsive to a move from an idle mode to an active mode;
    storing a time advance and the cell identifier based on a time advance group that corresponds to the one or more user devices;
    adapting a quality indication offset based on the time advance group;
    determining a downlink channel indication based on the quality indication offset and the time advance group; and
    activating a beam mode for communication with the one or more user devices of the time advance group based on the downlink channel indication.

2. The method of claim 1, wherein the beam mode comprises at least one of a channel reciprocity mode, codebook mode, or beamsweeping mode.

3. The method of claim 1, wherein the response identifier comprises a Random Access Radio Network Temporary Identifier.

4. The method of claim 1, wherein the cell identifier comprises a Cell Radio Network Temporary Identifier.

5. The method of claim 1, wherein the downlink channel indication comprises a physical downlink control channel channel quality indication (PDCCH CQI).

6. The method of claim 1, wherein the link management system comprises a gNodeB, and wherein the gNodeB is communicatively coupled to an antenna structured for massive multiple-input and multiple-output (mMIMO).

7. The method of claim 1, wherein a plurality of time advances and a plurality of cell identifiers are stored based on a plurality of time advance groups.

8. The method of claim 1, wherein a telecommunications network comprises a cell site, and wherein the cell site is operable based on a 5G New Radio network.

9. The method of claim 8, wherein the cell site comprises the link management system.

10. A non-transitory computer-readable storage media having computer-executable instructions embodied thereon that, when executed by one or more processors, cause the processors to:
replace, by a link management system communicatively coupled to one or more user devices, a response identifier with a cell identifier responsive to a move from an idle mode to an active mode;
store a time advance and the cell identifier based on a time advance group that corresponds to the one or more user devices in real-time or near real-time;
adapt a quality indication offset based on the time advance group;
determine a downlink channel indication based on the quality indication offset and the time advance group; and
activate a beam mode for communication with the one or more user devices of the time advance group based on the downlink channel indication.

11. The non-transitory computer-readable storage media of claim 10, wherein the beam mode comprises at least one of a channel reciprocity mode, codebook mode, or beamsweeping mode.

12. The non-transitory computer-readable storage media of claim 10, wherein the response identifier comprises a Random Access Radio Network Temporary Identifier, and wherein the cell identifier comprises a Cell Radio Network Temporary Identifier.

13. The non-transitory computer-readable storage media of claim 10, wherein a plurality of time advances and a plurality of cell identifiers are stored based on a plurality of time advance groups.

14. The non-transitory computer-readable storage media of claim 10, wherein the link management system comprises a gNodeB, and wherein the gNodeB is communicatively coupled to an antenna structured for massive multiple-input and multiple-output (mMIMO).

15. The non-transitory computer-readable storage media of claim 10, wherein the downlink channel indication comprises a physical downlink control channel channel quality indication (PDCCH CQI).

16. A system for controlling a downlink channel based on a time advance and a beam mode at a cell site, the system comprising:
a cell site comprising a link management system communicatively coupled to one or more user devices, the link management system to:
replace a response identifier with a cell identifier responsive to a move from an idle mode to an active mode;
store a time advance and the cell identifier based on a time advance group that corresponds to the one or more user devices;
adapt a quality indication offset based on the time advance group;
determine a downlink channel indication based on the quality indication offset and the time advance group; and
activate a beam mode for communication with the one or more user devices of the time advance group based on the downlink channel indication.

17. The system of claim 16, wherein the response identifier comprises a Random Access Radio Network Temporary Identifier, and wherein the cell identifier comprises a Cell Radio Network Temporary Identifier.

18. The system of claim 16, wherein the beam mode comprises at least one of a channel reciprocity mode, codebook mode, or beamsweeping mode.

19. The system of claim 16, wherein the link management system comprises a gNodeB communicatively coupled to an antenna structured for massive multiple-input and multiple-output (mMIMO).

20. The system of claim 16, wherein the downlink channel indication comprises a physical downlink control channel channel quality indication (PDCCH CQI).

* * * * *